United States Patent
Nowe

(10) Patent No.: US 10,252,737 B2
(45) Date of Patent: *Apr. 9, 2019

(54) SHELF FOR A TROLLEY

(71) Applicant: Container Centralen A/S, Odense (DK)

(72) Inventor: Wim Nowe, 's-Gravenzande (NL)

(73) Assignee: Container Centralen A/S, Odense (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/250,601

(22) Filed: Aug. 29, 2016

(65) Prior Publication Data

US 2017/0055709 A1    Mar. 2, 2017

(30) Foreign Application Priority Data

Aug. 31, 2015   (NL) .................................... 2015371

(51) Int. Cl.
| | |
|---|---|
| *A47B 57/16* | (2006.01) |
| *B62B 3/00* | (2006.01) |
| *A01G 9/14* | (2006.01) |
| *A47B 31/00* | (2006.01) |

(52) U.S. Cl.
CPC .............. *B62B 3/005* (2013.01); *A01G 9/143* (2013.01); *A47B 57/16* (2013.01); *B62B 3/006* (2013.01); *A47B 2031/003* (2013.01); *A47B 2031/005* (2013.01); *B62B 2202/70* (2013.01)

(58) Field of Classification Search
CPC . A47B 57/14; A47B 57/16; Y10T 428/24008; Y10T 428/24017

USPC ......... 108/147.11, 147.12, 147.15, 106, 107, 108/109, 189; 211/208, 153, 135, 134, 211/187, 190, 191, 192; 428/99, 100

See application file for complete search history.

(56) References Cited

U.S. PATENT DOCUMENTS

| | | | | |
|---|---|---|---|---|
| 566,305 | A * | 8/1896 | Geuder ................. | A47B 57/16 108/109 |
| 754,816 | A * | 3/1904 | Schriefer .............. | A47B 57/16 108/109 |
| 754,817 | A * | 3/1904 | Schriefer .............. | A47B 57/16 108/109 |
| 914,572 | A * | 3/1909 | Holden ................. | A47B 57/16 108/109 |
| 1,136,245 | A * | 4/1915 | Leland ................. | A47B 57/16 108/109 |
| 1,171,064 | A * | 2/1916 | O'Connor ........... | A47B 57/265 108/107 |
| 1,366,743 | A * | 1/1921 | O'Connor ........... | A47B 47/021 108/107 |

(Continued)

FOREIGN PATENT DOCUMENTS

| | | | | |
|---|---|---|---|---|
| CA | 938767 | | 12/1973 | |
| DE | 2805261 | * | 8/1978 | ............ A47B 57/16 |

(Continued)

*Primary Examiner* — Michael Safavi
(74) *Attorney, Agent, or Firm* — Peacock Law P.C.; Janeen Vilven; Camille Martinez

(57) ABSTRACT

A shelf for a trolley comprising a plate providing a surface for carrying goods, such as potted plants and flowers, and hooks for mounting the shelf in the trolley. One or more of the hooks are formed from a metal strip bent about an axis extending perpendicular to the central plane of the plate.

17 Claims, 3 Drawing Sheets

(56) References Cited

U.S. PATENT DOCUMENTS

| | | | | |
|---|---|---|---|---|
| 1,386,168 A * | 8/1921 | Erickson | A47B 57/16 | 108/109 |
| 1,411,260 A * | 4/1922 | Baker | A47B 57/40 | 108/107 |
| 1,545,165 A * | 7/1925 | O'Connor | A47B 47/024 | 108/189 |
| 1,554,011 A * | 9/1925 | Lehman | A47B 57/18 | 108/107 |
| 1,577,066 A * | 3/1926 | Medart | A47B 57/40 | 108/109 |
| 1,708,588 A * | 4/1929 | Proctor | F26B 25/18 | 108/109 |
| 1,814,090 A * | 7/1931 | Mically | A47B 57/402 | 108/109 |
| 1,820,716 A * | 8/1931 | Vance | A47B 57/425 | 108/109 |
| 1,829,009 A * | 10/1931 | Madsen | A47B 57/485 | 108/109 |
| 1,984,473 A * | 12/1934 | Gibson | A47B 57/482 | 108/107 |
| 2,005,593 A * | 6/1935 | Sandberg | A47B 57/404 | 108/109 |
| 2,026,223 A * | 12/1935 | Donnelly | A47B 57/30 | 108/109 |
| 2,213,115 A * | 8/1940 | Bales | A47B 57/16 | 108/109 |
| 2,469,657 A * | 5/1949 | Linda | B60N 3/004 | 108/117 |
| 2,719,633 A * | 10/1955 | Rosenberg | A47B 47/024 | 108/109 |
| 2,907,471 A * | 10/1959 | Henry | A47B 57/404 | 108/109 |
| 2,936,078 A * | 5/1960 | Ziegler | F16B 12/30 | 108/186 |
| 3,168,365 A * | 2/1965 | Evans | A47B 57/16 | 108/109 |
| 3,194,407 A * | 7/1965 | D Altrui | A47B 45/00 | 108/106 |
| 3,294,250 A * | 12/1966 | Evans | A47B 57/22 | 108/147.15 |
| 3,341,027 A * | 9/1967 | Mackin, Jr. | A47B 57/20 | 108/106 |
| 3,343,506 A * | 9/1967 | Buchbinder | A47B 57/16 | 108/107 |
| 3,351,313 A * | 11/1967 | Guillon | A47B 57/565 | 108/106 |
| 3,366,432 A * | 1/1968 | Carmer | F25D 17/06 | 108/109 |
| 3,479,974 A * | 11/1969 | Ferdinand | F16B 12/32 | 108/107 |
| 3,487,790 A * | 1/1970 | Rous | A47B 57/402 | 108/107 |
| 3,506,138 A * | 4/1970 | Merton | A47B 47/03 | 108/189 |
| 3,536,016 A * | 10/1970 | Chesley | A47B 31/00 | 108/181 |
| 3,900,111 A * | 8/1975 | Hiler | A47B 57/402 | 211/192 |
| 3,977,529 A * | 8/1976 | Stroh | A47F 5/135 | 108/181 |
| 4,173,934 A * | 11/1979 | Searby | A47B 57/38 | 108/107 |
| 4,180,003 A * | 12/1979 | Clement | A47B 57/16 | 108/147.15 |
| 4,201,139 A * | 5/1980 | Suttles | A47B 57/40 | 108/109 |
| 4,317,523 A * | 3/1982 | Konstant | A47B 57/402 | 108/107 |
| 4,500,146 A * | 2/1985 | Peterson | A47B 45/00 | 108/102 |
| 4,558,647 A * | 12/1985 | Petersen | A47B 57/14 | 108/107 |
| 4,603,782 A * | 8/1986 | Fenwick | A47B 57/20 | 108/107 |
| 4,796,541 A * | 1/1989 | Halstrick | A47B 57/402 | 108/107 |
| 5,065,873 A * | 11/1991 | Tseng | A47B 57/54 | 108/107 |
| 5,632,389 A * | 5/1997 | Rosenband | A47B 57/40 | 108/109 |
| 5,644,993 A * | 7/1997 | Dohnalik | A47B 21/02 | 108/108 |
| 5,718,441 A * | 2/1998 | Kern | A47B 57/14 | 211/187 |
| 5,797,503 A * | 8/1998 | Stevens | A47B 31/00 | 108/107 |
| 6,135,583 A * | 10/2000 | Simon | A47B 47/00 | 108/189 |
| 6,220,464 B1 * | 4/2001 | Battaglia | A47B 57/54 | 108/107 |
| 6,286,694 B1 * | 9/2001 | Battaglia | A47B 55/02 | 108/107 |
| 6,311,856 B2 * | 11/2001 | Battaglia | A47B 57/54 | 108/107 |
| 6,814,362 B2 * | 11/2004 | Hanson | B62B 3/006 | 108/107 |
| 7,386,954 B2 | 6/2008 | Korte et al. | | |
| 7,886,673 B2 * | 2/2011 | Korte | A01G 9/143 | 108/110 |
| 2003/0160409 A1 | 8/2003 | Hanson et al. | | |
| 2015/0090683 A1 * | 4/2015 | Sabounjian | A47B 96/14 | 211/186 |
| 2016/0029787 A1 * | 2/2016 | Go | A47B 57/08 | 211/187 |

FOREIGN PATENT DOCUMENTS

| | | | | |
|---|---|---|---|---|
| DE | 3619262 A1 * | 12/1987 | | A47B 57/16 |
| EP | 1686037 * | 8/2006 | | A01G 9/143 |
| EP | 2340978 | 7/2011 | | |
| EP | 2430947 * | 3/2012 | | A47B 57/16 |
| EP | 3141453 * | 3/2017 | | A47B 57/16 |
| FR | 2319842 A1 * | 2/1977 | | A47B 57/16 |
| GB | 1278478 * | 6/1972 | | A47B 57/08 |
| WO | 2007/063109 | 6/2007 | | |
| WO | WO 2016056912 A1 * | 4/2016 | | B62B 3/02 |

\* cited by examiner

SHELF FOR A TROLLEY

CROSS-REFERENCE TO RELATED APPLICATIONS

This application claims priority to and the benefit of the filing of Netherlands Patent Application No. 2015371, filed on Aug. 31, 2015, and the specification and claims thereof are incorporated herein by reference.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION BY REFERENCE OF MATERIAL SUBMITTED ON A COMPACT DISC

Not Applicable.

STATEMENT REGARDING PRIOR DISCLOSURES BY THE INVENTOR OR A JOINT INVENTOR

Not Applicable.

COPYRIGHTED MATERIAL

Not Applicable.

BACKGROUND OF THE INVENTION

Field of the Invention (Technical Field)

The present invention relates to a shelf for a trolley comprising a plate providing a surface, preferably a planar or substantially planar surface for carrying goods, such as potted plants and flowers, and hooks for mounting the shelf in the trolley.

Description of Related Art Including Information Disclosed Under 37 C.F.R. §§ 1.97 and 1.98:

Trolleys for potted plants, flowers et cetera are known in the art, e.g., from EP 2 340 978, which relates to a "holder (20) for the reduction of noise from a shelf mounted on the pillars (50) of a load carrier by means of holders. The holder is introduced into complementary slots in the pillars (50) and is configured with a notch (22) having a carrier face. Hereby the holder is able to engage with the slot in such a manner that the holder has bearing on the pillar. The holder comprises a resilient element (30) arranged in the notch to the effect that the resilient element (30) causes the carrier face to not enter into contact with the pillar when the shelf is not loaded with goods; and that the resilient element is compressed when a load of goods is loaded onto the shelf."

DK 2000 01677 relates to a method and installation for separating and assembly of shelf containers which involve the containers having a base frame, removable corner uprights and shelves.

US 2003/160409 relates to a wheeled agricultural cart for transporting plant materials having at least one removable shelf. The cart has vertical pillars at each corner thereof with a plurality of substantially rectangular vertical slots. Each shelf has a frame including downward facing hook members at each corner thereof. The shelf is removably attached to the cart by insertion of each hook member into a slot on a corresponding vertical pillar.

BRIEF SUMMARY OF THE INVENTION

The shelf according to the present invention is intended for use in returnable transport trolleys, i.e., trolleys that are part of a vast and open pool of trolleys, e.g., hundreds of thousands or more, for moving goods in standard sizes. Such a pool facilitates logistics from producers via wholesalers, cross-docking, and/or storage to retailers and vice versa. An open pool enables free exchange of trolleys, which saves time, transport costs, and administration. Empty trolleys can be exchanged for trolleys carrying goods, or the other way round, all through the supply chain.

Such pools are typically owned, managed, and maintained by one or few entities and items from the pool are hired and used by many entities. Maintaining a pool is a costly affair, especially when the pool ages and/or when similar, cheaper items of an inferior quality are added to the pool by third parties to avoid having to hire shelves.

It is an object of the present invention to provide an improved shelf for a trolley intended for use in a pool.

To this end, in the shelf according to the present invention one or more, preferably all of the hooks are formed from a metal strip bent about an axis extending perpendicular to the central plane of the plate. In an embodiment, the hooks comprise two portions, i.e., legs, of the strip, preferably diverging or parallel portions, each of the portions comprising a notch, and the notches are aligned.

The hooks according to the present invention allow efficient use of metal and a robust construction at relatively low weight and little waste and facilitate the manufacture of the shelves. Further, the strip facilitates inclusion of further features as will become apparent from the preferred embodiments.

In an embodiment, a portion of a strip extends along and/or in a side of the plate. In a refinement, a first portion of a strip extends along and/or in a first side of the plate and a second portion of a strip extends along and/or in a second side of the plate.

In a further refinement, the plate comprises one or more channels or (box) girders and a portion of a strip extends in a channel or (box) girder of the plate and preferably closes off or even seals an end of such channel or girder.

Thus, both the short sides and the long sides of the plate are directly supported by the hooks, i.e. the long sides via the inner legs of the hooks and the short sides via the outer legs of the hooks. This avoids or at least reduces concentration of loads.

In an embodiment, at least two hooks on opposite sides of the plate are identical and, when built into the plate, mirrored. Thus, the number of unique parts is reduced and manufacturing is further simplified.

A reinforcing and/or dampening material is positioned between the portions (legs) defining the hooks.

In an embodiment, the strip is attached to the plate, e.g. by welding, clinching, riveting or an adhesive, and forms a beam for transferring forces from a load on the shelf to the hooks, and via the hooks to the posts of the trolley.

In another embodiment, two hooks are formed in the same strip and located on or near opposite (long) sides of the shelf.

For use in current pools of trolley, it is preferred that the shelf is rectangular and elongated and comprises a hook at each corner, preferably having a length in a range from trolley 1250 to 1350 mm, e.g. 1320 mm, and two parallel relatively short sides, preferably having a width of 530 to 570 mm, e.g. 550 mm.

To prevent or at least hinder the shelf from being used in existing pools, in an embodiment, the hooks extend in lateral direction, i.e. a direction parallel to the short sides.

To render the shelf more robust, it is preferred that the material of the strip has a yield strength of at least 500 MPa, preferably at least 600 MPa. Within the framework of the present invention, yield strength of a material is defined as the stress at which a material begins to deform plastically.

The invention further relates to a trolley comprising a plurality of rectangular and elongated shelves as described above and a plurality of corner posts, sometimes also referred to as pillars or uprights, provided with a series of openings receiving the hooks of the shelves.

The invention will now be explained in more detail with reference to the figures, which schematically show embodiments according to the present invention.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figure 1:
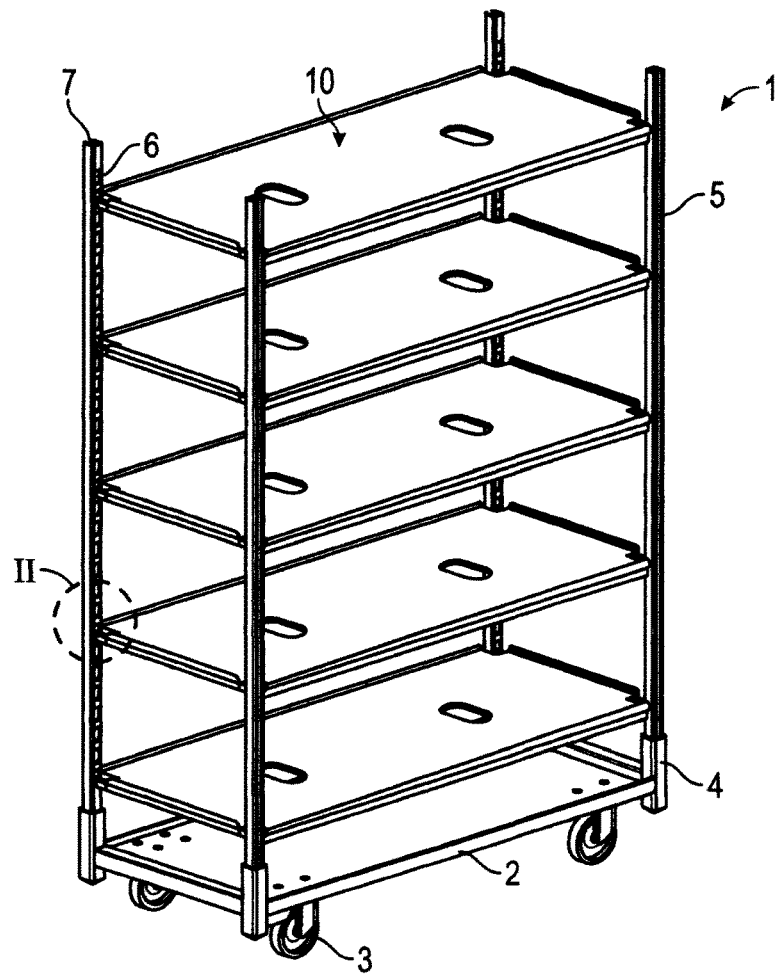
FIG. 1 is a perspective view of a trolley carrying a plurality of shelves according to the present invention.
Figure 2:
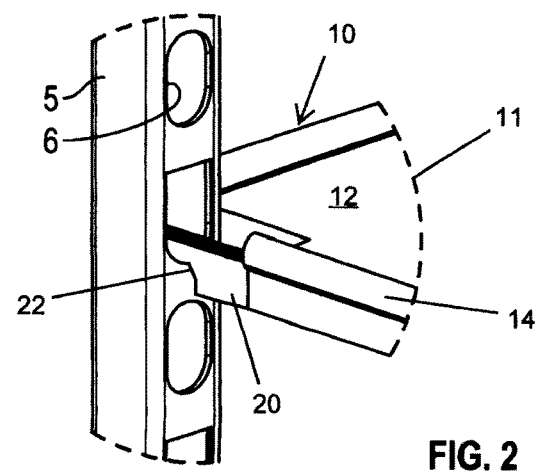
FIG. 2 is a detail of FIG. 1, showing a corner of a shelf hooked in a corner post of the trolley.

FIGS. 1 and 2 show a trolley 1 for carrying goods, such as potted plants and flowers, comprising a rectangular and elongated frame 2 provided with four wheels 3 at its underside near each corner and a holder 4 for a post 5 at each corner. A post 5 is placed in each holder. In this example, the holders and posts all have a square cross-section with the posts having outer dimensions (width) that are slightly smaller than the inner dimensions of the holders. Thus, the posts are slidably and removably positioned in the holders in one of four positions. Each post has on one of its four sides a series of openings 6 and on the side opposite from the openings a slot 7 running the length of the post. A plurality of shelves 10 is mounted in the trolley.

Figure 3:
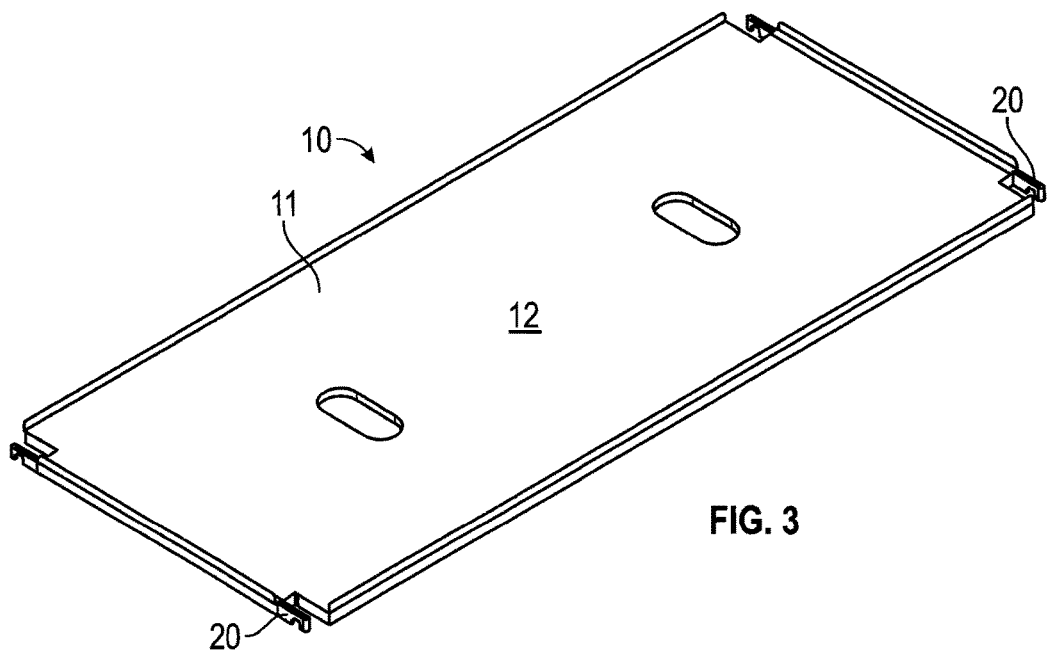
FIGS. 3 and 4 are perspective top views of a shelf and a cross-sectioned shelf according to the present invention.
Figure 4:
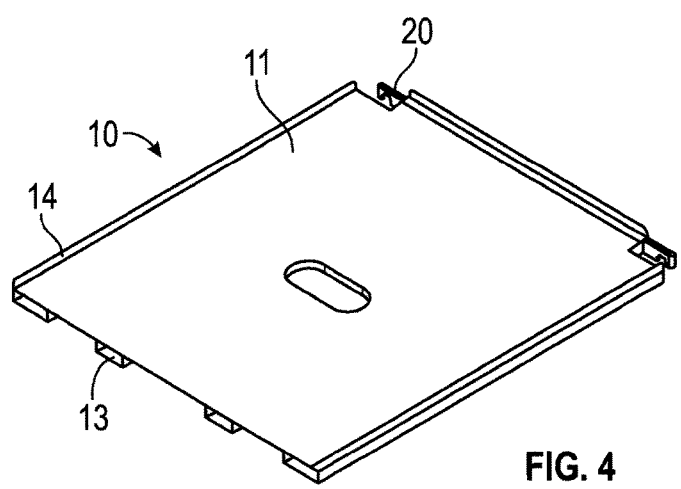
Figure 5:
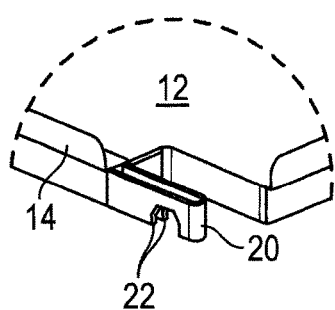
FIGS. 5 to 7 show details of a hook portion of the shelf is a detail of the shelf shown in FIG. 3.
Figure 6:
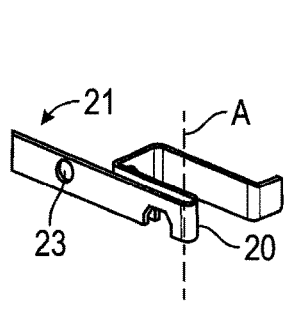
Figure 7:
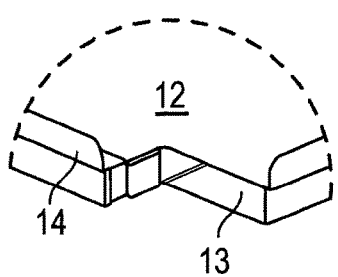

FIGS. 3 and 4 show a single rectangular and elongated shelf 10 suitable to be mounted in the trolley 1 shown in FIGS. 1 and 2. The shelf has a plate 11 providing a planar top surface 12 for carrying goods. A plurality of box girders 13 is formed on and/or attached to the bottom surface of the plate, to render the shelf sufficiently stiff and strong. The long and short edges of the plate are provided with raised edges 14.

The shelf has a hooks 20 at each corner. With these hooks, the shelf 10 can be mounted at a selected height in the trolley by tilting the shelf, inserting a pair of hooks in openings at the selected height, lowering the shelf until it is horizontal and slightly shifting the shelf to insert the pair of hooks on the opposite side of the shelf in openings 6 in the posts 5 on the opposite side of the trolley 1.

As shown in FIGS. 5, 6, and 8-10, the hooks 20 are made from a metal strip 21. In this example, the strip is made of resilient steel having a yield strength of 600 MPa, a thickness of 2 mm, and a height of 20 mm. At both ends, the strip is bent about an axis A extending in the height direction of the strip (perpendicular to the central plane of the plate in the finished shelf). Two notches 22 are provided near each end of the strip, which notches align after bending the strip about axis A, thus forming hooks.

The strip is provided with a plurality of holes 23, which allow, e.g., clinching the ends of the plate to the strip, and four notches.

In this example, the strip is bent, at each end, at three further positions and all about axes extending in the height direction of the strip, to form portions 24 for clinching the plate 11 to the strip 21 and providing an appropriate distance between the hooks 20 and the plate 11, portions 25 for closing off the ends of the box girders in or near the long sides of the plate 11 and portions 26 extending in the box girders in or near the long sides of the plate 11.

Figure 8:
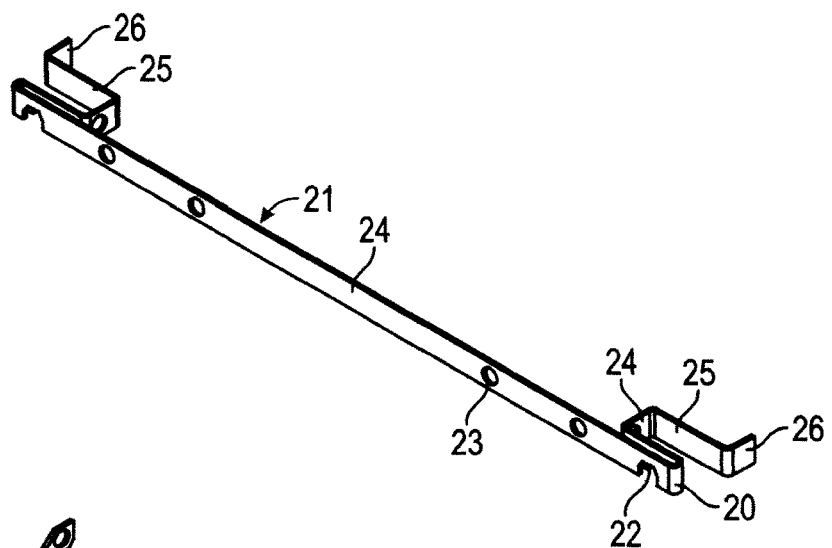
FIGS. 8 to 10 show three different embodiments of a strip comprising a hook at each end.
Figure 9:
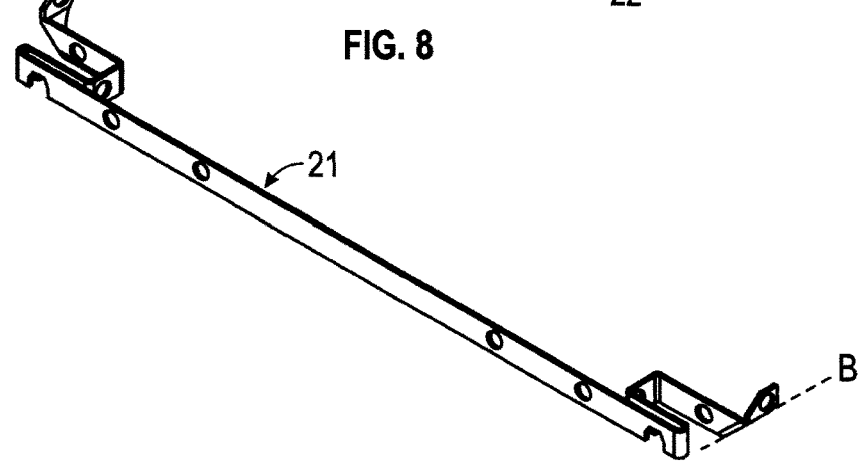
Figure 10:
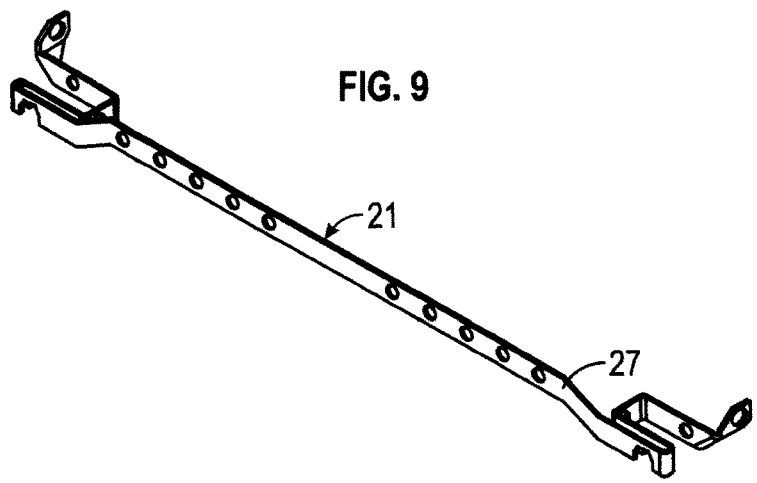

The plate 11 is clinched to the strip 21 by folding edge portions of the plate over the strip and clinching the portions of the plate together through the openings 23 in the strip. Identical but mirrored strips are attached to each of the short sides of the shelf, as shown in FIGS. 3 and 8.

The present shelf is a robust construction at relatively low weight and facilitates the manufacture of the shelves with little waste. By providing hooks, which, seen in a top view, each have two legs, one supporting a long side of the shelf and one supporting a short side, forces in the shelf are distributed more evenly. E.g., concentration of forces from a long side and a short side are avoided, e.g., when forces are transferred from a long to a hook via a short side, are avoided or at least reduced.

The invention is not restricted to the above-described embodiments, which can be varied in a number of ways within the scope of the claims. For instance, instead of forming two hooks in a strip and providing two strips in a shelf, in an embodiment, hooks are formed from four (shorter) strips, i.e., one hook in each strip. Also, the strips(s) may comprises bends about axes at other angles. E.g., the strip 21 shown in FIG. 9 comprises at each end a bend about an axis B of 45 degrees, relative to the plate 11 in the finished shelf. It further comprises bends about an axis parallel to the plane of the plate, to raise the ends of the strip, e.g., to enable attaching, i.e., clinching, the plate to the strips at different heights. Also, in addition to one or more bent portions the strips(s) may comprise stepped or inclined portions 27, e.g., to match features in the plate.

What is claimed is:

1. A shelf for a trolley comprising a plate providing a surface for carrying goods and hooks for mounting the shelf in the trolley, wherein one or more of the hooks are formed from a strip bent about an axis extending perpendicular to a central plane of the plate, wherein the hooks comprise two portions of the strip, each of the portions comprise a notch, and the notches are horizontally aligned after bending the strip about said axis, thus forming downward facing hooks.

2. The trolley according to claim 1, wherein the hooks comprise two diverging portions of the strip.

3. The trolley according to claim 1, wherein the hooks comprise two parallel portions of the strip.

4. The shelf according to claim 1, wherein a first portion and/or a second portion of the strip extends along and/or in a first side and/or a second side of the plate.

5. The shelf according to claim 4, wherein the first portion of the strip extends along and/or in the first side of the plate and the second portion of the strip extends along and/or in the second side of the plate, the second side of the plate extending at a right angle with the first side of the plate.

6. The shelf according to claim 1, wherein a first portion of the strip extends in a channel or girder of the plate.

7. The shelf according to claim 6, wherein a second portion of the strip closes off an end of the channel or girder of the plate.

8. The shelf according to claim 1, wherein at least two hooks on horizontally opposite sides of the plate are identical and, when inserted into the plate, are horizontally mirrored.

9. The shelf according to claim 1, wherein a reinforcing and/or dampening material is positioned between two portions defining the hooks.

10. The shelf according to claim 1, wherein the strip is attached to the plate and forms a beam for transferring forces from a load on the shelf to the hooks.

11. The shelf according to claim 1, wherein two hooks are formed in the strip and located on or near opposite sides of the shelf, said hooks capable of directly supporting both the short sides of the plate and the long sides of the plate.

12. The shelf according to claim 1, wherein the shelf is rectangular and elongated and comprises the hooks at each corner.

13. The shelf according to claim 12, having a length in a range from 1250 to 1350 mm and a width in a range from 530 to 570 mm.

14. The shelf according to claim 12, wherein the hooks extend in a lateral direction.

15. The shelf according to claim 1, wherein the material of the strip has a yield strength of at least 500 MPa.

16. The shelf according to claim 15, wherein the material of the strip has a yield strength of at least 600 MPa.

17. A trolley for carrying goods, comprising a plurality of rectangular and elongated shelves according to claim 1 and a plurality of corner posts each provided with a series of openings receiving the hooks of the shelves.

* * * * *